(12) United States Patent
Yao et al.

(10) Patent No.: US 12,346,680 B2
(45) Date of Patent: Jul. 1, 2025

(54) CONTAINER-BASED OPERATING SYSTEM FOR CELLULAR USER EQUIPMENT

(71) Applicant: DISH Wireless L.L.C., Englewood, CO (US)

(72) Inventors: Kevin Yao, Cheyenne, WY (US); Prashant Raghuvanshi, Parker, CO (US)

(73) Assignee: DISH Wireless L.L.C., Englewood, CO (US)

(*) Notice: Subject to any disclaimer, the term of this patent is extended or adjusted under 35 U.S.C. 154(b) by 240 days.

(21) Appl. No.: 17/955,343

(22) Filed: Sep. 28, 2022

(65) Prior Publication Data

US 2024/0103838 A1 Mar. 28, 2024

(51) Int. Cl.

| | | |
|---|---|---|
| G06F 9/445 | (2018.01) | |
| G06F 8/61 | (2018.01) | |
| G06F 8/65 | (2018.01) | |
| G06F 8/656 | (2018.01) | |
| G06F 9/455 | (2018.01) | |
| G06F 9/54 | (2006.01) | |
| G06F 17/00 | (2019.01) | |
| H04L 9/32 | (2006.01) | |
| H04L 41/082 | (2022.01) | |

(52) U.S. Cl.
CPC ............. *G06F 8/65* (2013.01); *G06F 9/547* (2013.01); *H04L 41/082* (2013.01)

(58) Field of Classification Search
CPC . G06F 8/65; G06F 9/547; G06F 9/455; G06F 9/4401; G06F 9/4558; G06F 3/1454; G06F 3/0488; G06F 8/61; G06F 8/41; G06F 8/40; G06F 8/71; G06F 8/43; G06F 16/951; G06F 8/656; H04L 41/082; H04L 67/34; H04L 67/1095; H04L 67/52; H04L 67/55; H04L 67/025; G06Q 10/06313; H04W 76/10; H04W 8/18; H04W 4/025; G01C 21/343
See application file for complete search history.

(56) References Cited

U.S. PATENT DOCUMENTS

| | | | |
|---|---|---|---|
| 9,298,958 B1* | 3/2016 | Amir ................. | H04W 52/0216 |
| 10,127,030 B1* | 11/2018 | Mortman .............. | H04L 9/3236 |
| 10,372,796 B2* | 8/2019 | Warila ................. | H04W 84/12 |
| 11,106,455 B2* | 8/2021 | Myers ................. | G06F 9/45558 |
| 2016/0098265 A1* | 4/2016 | Mahajan ................ | G06F 8/71 |
| | | | 717/170 |
| 2017/0339223 A1* | 11/2017 | Lee ......................... | H04L 65/65 |
| 2020/0026505 A1* | 1/2020 | Olderdissen ........ | G06F 9/44526 |
| 2020/0287802 A1* | 9/2020 | Singh ................... | H04L 41/046 |
| 2023/0116044 A1* | 4/2023 | Han ...................... | G11B 27/34 |
| | | | 348/220.1 |
| 2024/0061923 A1* | 2/2024 | Salisbury .............. | G06F 21/316 |

* cited by examiner

*Primary Examiner* — Thuy Dao
(74) *Attorney, Agent, or Firm* — KW Law, LLP (57) ABSTRACT

Processes, computing systems, devices, and automated processes variously perform or include operations to update a cellular device running a container-based operating system. A container management server (CMS) of a cellular network receives a communication from the cellular device over the cellular network. The CMS retrieves a list of containers deployed on the cellular device. The CMS then compares a deployed container from the list to an updated container to identify the deployed container as invalid. The CMS may push the updated container to the cellular device in response to identifying the deployed container as invalid.

20 Claims, 3 Drawing Sheets

CONTAINER-BASED OPERATING SYSTEM FOR CELLULAR USER EQUIPMENT

TECHNICAL FIELD

The following description generally relates to operating systems, and more particularly, to container-based operating systems for cellular devices.

BACKGROUND

Wireless networks that transport digital data and telephone calls are becoming increasingly sophisticated. Currently, fifth generation ("5G") broadband cellular networks are being deployed around the world. These 5G networks use emerging technologies to support data and voice communications with millions, if not billions, of mobile phones, computers and other devices. 5G technologies are capable of supplying much greater bandwidths than was previously available, so it is likely that the widespread deployment of 5G networks could radically expand the number of services available to customers.

Computing devices like smartphones, tablets, and laptops enable users to interact on 5G networks. These devices typically run an operating system to bridge the gap between hardware and third-party applications. Common operating systems include iOS, Windows, and Android, for example. Operating systems receive updates to push bug fixes, remediate security vulnerabilities, or add new features.

The update process for typical operating systems, while straight forward from the user's perspective, often dictates that a user restarts their device. The user typically cannot access the device or data stored on the device again until the update completes. An operating system can take several minutes to update. Current operating system updates thus prevent users from accessing their devices and data for several minutes while the update process runs to completion. The downtime for a relatively simple update being pushed as an OS revision may take 15 minutes on some computing devices with limited computing resources. The duration often taken installing operating system updates can pose a safety hazard, as users may not be able to call for help in case of emergency.

An update could be required, for example, to improve camera operation on a smartphone. Despite only changing the interactions between the operating system and the camera, the entire operating system may be updated in this example. The smartphone would be unusable for several minutes as the update to the camera software, which is pushed as an operating system update, completes. The user in this example cannot use other features of the smartphone unrelated to the updated camera software because the update is pushed as an operating system revision.

BRIEF DESCRIPTION

Various embodiments relate to processes, computing systems, devices, and other aspects that variously perform or include operations to update a cellular device using a container management server (CMS) of a cellular network. The operations include receiving a communication from the cellular device over the cellular network. The CMS retrieves a list of containers deployed on the cellular device. The CMS then compares a deployed container from the list to an updated container to identify the deployed container as outdated. The CMS pushes the updated container to the cellular device in response to identifying the deployed container as outdated.

In various embodiments, the cellular device terminates the deployed container running on the cellular device in response to the deployed container being identified as outdated. The deployed container is replaced with the updated container in response to terminating the deployed container. The cellular device launches the updated container in response to replacing the deployed container with the updated container. The CMS logs health data related to the deployed container running on the cellular device. The communication from the cellular device may include an API call directed to the CMS, may be directed to a network host to establish a connection on the cellular network, or may be triggered in response to booting the cellular device. The updated container runs on an abstraction layer of the cellular device. The deployed container includes a previous version of firmware supporting transmission on the cellular network, and the updated container includes a current version of the firmware supporting the transmission on the cellular network.

Some embodiments include a method of updating a cellular device using a CMS of a cellular network. The method includes the step of receiving a communication from the cellular device over a connection on the cellular network. The CMS identifies a deployed container running on the cellular device as being outdated in response to receiving the communication over the connection on the cellular network. The CMS may push updated container over the connection on the cellular network to the cellular device in response to identifying the deployed container as being outdated.

Other embodiments include a wireless communication system associated with a host network. The wireless communication system includes a wireless radio unit (RU) configured to broadcast and receive transmissions over a spectrum. The transmissions support network services available to user equipment (UE) over the host network. A CMS on the host network includes a processor in communication with non-transitory memory storing instructions that, when executed by the processor, cause the container management server to perform operations. The operations include receiving a communication from the user equipment over a connection on the host network. The CMS identifies a deployed container running on the user equipment as being outdated in response to receiving the communication over the connection on the host network, and it pushes an updated container over the connection on the host network to the user equipment in response to identifying the deployed container as being outdated.

DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the illustrations.

DETAILED DESCRIPTION

The following detailed description is intended to provide several examples that will illustrate the broader concepts set forth herein, but it is not intended to limit the invention or applications of the invention. Furthermore, there is no intention to be bound by any theory presented in the preceding background or the following detailed description.

Embodiments of the subject matter described herein generally relate to a container-based operating system (container OS) for computing devices connected to 5G networks such as smartphones, tablets, laptops, or computers, for examples. As used herein, the terms "container" and "microservice" are synonymous and refer to a grouping of software that packages code along with dependencies and libraries used by the software for deployment on hardware. Containerized applications may thus run the same software in varied computing environments.

In some embodiments, Internet of things (IoT) devices, connected automobiles, or other cellular-enabled devices interact with a cellular network to maintain desired revisions of containerized software. By running a container OS, such devices can receive compartmentalized updates to software that might otherwise be pushed through operating system updates with reboots. The container OS enables updates to drivers (e.g., the camera driver of a smartphone) while other components of the smartphone continue operating. Users can continue to access their devices while the container OS switches the software (e.g., the driver or application) from running in the old container to running in the new container. Updates may appear seamless or nearly seamless to users. Updates may also be pushed without reboots that can interrupt user access to their device and data.

Various embodiments of the container OS include an abstraction layer with libraries and dependencies working in concert to run the same container-based software on different hardware configurations. The container OS may thus serve as a virtualization layer or an intermediary runtime environment to the abstraction layer to improve compatibility with a range of computing hardware. The container OS may not be limited to operating on a particular smartphone model, for example, and may support containers operating on tablets, computers, and other competing hardware platforms that communicate on a cellular network. Testing for the container OS may be streamlined because many hardware configurations use the same operating system layer. The network operator or network host identifies software revisions installed on connected devices and sends current versions as appropriate.

Figure 1:
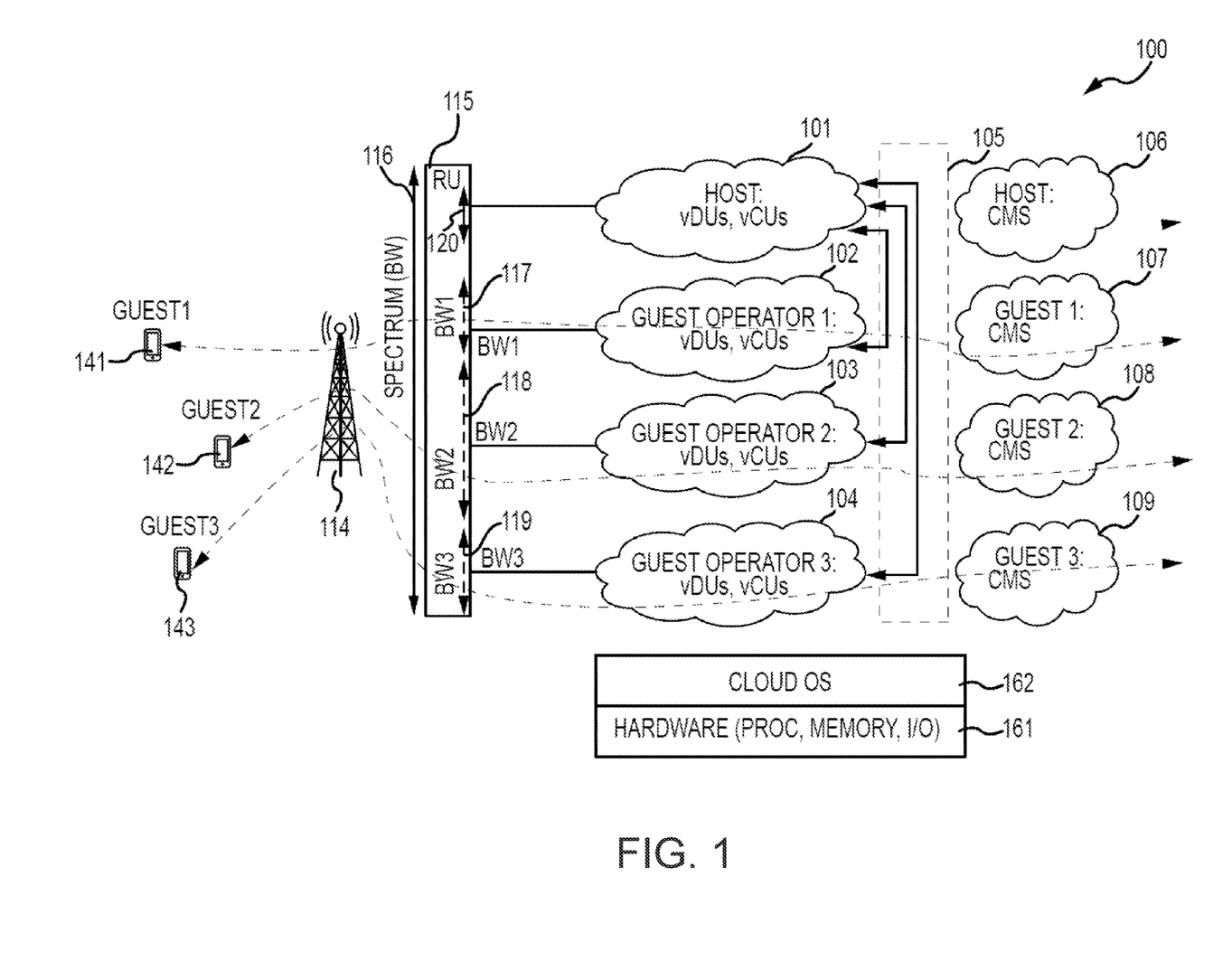
FIG. 1 illustrates a system for updating and operating a computing device having a container-based operating system in communication with a cellular network, in accordance with various embodiments.

With reference now to FIG. 1, an example cellular communication system 100 is shown, in accordance with various embodiments. Cellular communication system 100 includes a host operator maintaining ownership of one or more radio units (RUs) 115 associated with a wireless network cell. The example of FIG. 1 depicts a host operator operating a "radio/spectrum as a service (R/SaaS)" that allocates bandwidth on its own radio units for use by one or more guest network operators. The host and the guest network operators may maintain desired versions of software on user equipment (UE) 141, 142, 143 running a container OS. While FIG. 1 depicts a R/SaaS example, other rudimentary cellular network configurations may be used to maintain software on UE running a container OS as described herein. R/SaaS systems are described in detail in U.S. patent application Ser. No. 17/566,945, which is incorporated herein by reference for any purpose.

In the example of FIG. 1, each RU 115 communicates with UE 141, 142, 143 operating within a geographic area using one or more antennas/towers 114 capable of transmitting and receiving messages within an assigned spectrum 116 of electromagnetic bandwidth. In various embodiments, guest networks 102, 103, 104 interact with a provisioning plane 105 to obtain desired spectrum (e.g., portions of bandwidth 117, 118, 119 respectively) across one or more of the RUs 115 operated by the host 101. Provisioning plane 105 allows guest network operators to obtain or change their assigned bandwidths on different RUs 115 on an on-demand and dynamic basis. Guest CMS 107, 108, 109 and host CMS 106 may host and manage software deployed on UE 141, 142, 143 in the form of containers.

The Open RAN standard breaks communications into three main domains: the radio unit (RU) that handles radio frequency (RF) and lower physical layer functions of the radio protocol stack, including beamforming; the distributed unit (DU) that handles higher physical access layer, media access (MAC) layer and radio link control (RLC) functions; and the centralized unit (CU) that performs higher level functions, including quality of service (QoS) routing and the like. The CU also supports packet data convergence protocol (PDCP), service data adaptation protocol (SDAP) and radio resource controller (RRC) functions. The RU, DU and CU functions are described in more detail in the Open RAN standards, as updated from time to time, and may be modified as desired to implement the various functions and features described herein. In the example of FIG. 1, host 101 maintains one or more DUs and CUs as part of its own network. The DU suitably communicates with one or more RUs 115, as specified in the Open RAN standard.

The various network components shown in FIG. 1 are typically implemented using software or firmware instructions that are stored in a non-transitory data storage (e.g., a disk drive or solid-state memory) for execution by one or more processors. The various components shown in FIG. 1 can be implemented using cloud-based hardware 161 and an appropriate operating system 162 such as the Amazon Web Service (AWS) platform provided by Amazon Inc., although other embodiments could use other cloud platforms and/or any type of conventional physical computing hardware 161, as desired.

As illustrated in the example of FIG. 1, system 100 includes a host network 101 and one or more guest networks 102, 103, 104. The host network 101 is typically operated by an organization that owns radio equipment and sufficient spectrum (potentially on different bands) to offer 5G capacity and coverage. Host network 101 provides 5G service to its own UEs, and it manages containerized software on its own UEs or those of its guest operators. Host network 101 includes at least one DU and at least one CU, both of which will typically be implemented virtually using cloud resources. If host network 101 provides container management services, then it may also possess software management services described in greater detail below.

Guest networks 102, 103, 104 operated by guest operators can manage their own networks using allocated portions of the bandwidth 117, 118, 119 handled by one or more of the RUs 115 associated with the host 101. The guest networks 102, 103, 104 communicate with one or more UEs 141-143 using allocated bandwidth 117, 118, 119 on the host's RU 115. Guest networks 102, 103, 104 may include one or more virtual DUs and CUs, as well as container management server (CMS), as desired. Generally, one or more guest operators will instantiate its own 5G virtualized network functions (e.g., CMS, vCUs, vDUs, etc.) using cloud-based resources, as noted above. However, various embodiments may operate outside of cloud-based environments. Host network 101 may also instantiate its own CMS 106 to manage container-based software deployed or running on UE 141-143. Some embodiments may include host 101 and host CMS 106 communicating with UE 141-143 without guest operators hosting guest networks.

Guest operators lease or otherwise obtain any needed 5G access for its planned services, capacity and coverage based on an arrangement with the host provider. A guest provider may then operate and manages its own 5G network 102, 103, 104 independently of the host 101 and the other guests. An orchestrator aligns all the entities including the host and the guests. A network operator can optimize its own network for unique target services by intelligently selecting its spectrum, RUs, vDU/MAC scheduler, vCU and CMS 106, 106, 108, 109.

Each RU 115 is typically associated with a different wireless cell that provides wireless data communications to user devices 141-143. RUs 115 may be implemented with radios, filters, amplifiers and other telecommunications hardware to transmit digital data streams via one or more antennas 114. Generally, RU hardware includes one or more processors, non-transitory data storage (e.g., a hard drive or solid state memory) and appropriate interfaces to perform the various functions described herein. RUs are physically located on-site with the transmitter/antenna 114, as appropriate. Conventional 5G networks may make use of any number of wireless cells spread across any geographic area, each with its own on-site RU 115. CMS 106 of host network 101 or CMS 107, 108, 109 of guest networks 102, 103, 104 monitors container-based software deployed on each UE communicating with RUs 115.

RUs 115 support wireless communications with any number of user devices 141-143. UE 141-143 are often mobile phones or other portable devices that can move between different cells associated with the different RUs 115, although 5G networks are also widely expected to support home and office computing, industrial computing, robotics, Internet-of-Things (IoT) and many other devices. While the example illustrated in FIG. 1 shows one RU 115 for convenience, a practical implementation will typically have any number of RUs 115 that can each be individually configured to provide highly configurable geographic coverage for a guest network, if desired. CMS 106, 107, 108, 109 validate containers running on UE 141, 142, 143 in response to UE 141, 142, 143 communicating with a different RU 115 of cellular communication system 100.

Host 101 and guest operators 102-104 can automatically scale and manage system health using the container OS and CMS systems described herein. If a container is throwing errors, over consuming resources, or looping uncontrollably on UE 141-143, host 101 or guests 102-104 can kill and automatically restart a container running on user equipment 141-143. Host 101 and guests 102-104 may also stagger updates and software rollouts over cellular communication system 100. Container updates may be staggered to manage traffic and avoid large outages or data slowdowns. Host 101 and guests 102-104 monitor UE 141-143 for problematic operations or problematic installations. Once detected, Host 101 and guests 102-104 can kill, reinstall, or restart problematic containers without rebooting UE 141-143. Due to their positions in the cellular network, host 101 and guest operators 102-104 monitor health of UE 141-143 continuously or at regular intervals in response to UE 141-143 connecting to cellular communication system 100.

UE 141-143 each run a container OS, which is runs on various types of UE. For example, UE 141-143 in communication with a 5G cellular network could be smart watches, smart phones, laptops, personal computers, servers, IOT devices, connected automobiles, or other distributed computing resources connected to the cellular network.

Figure 2:
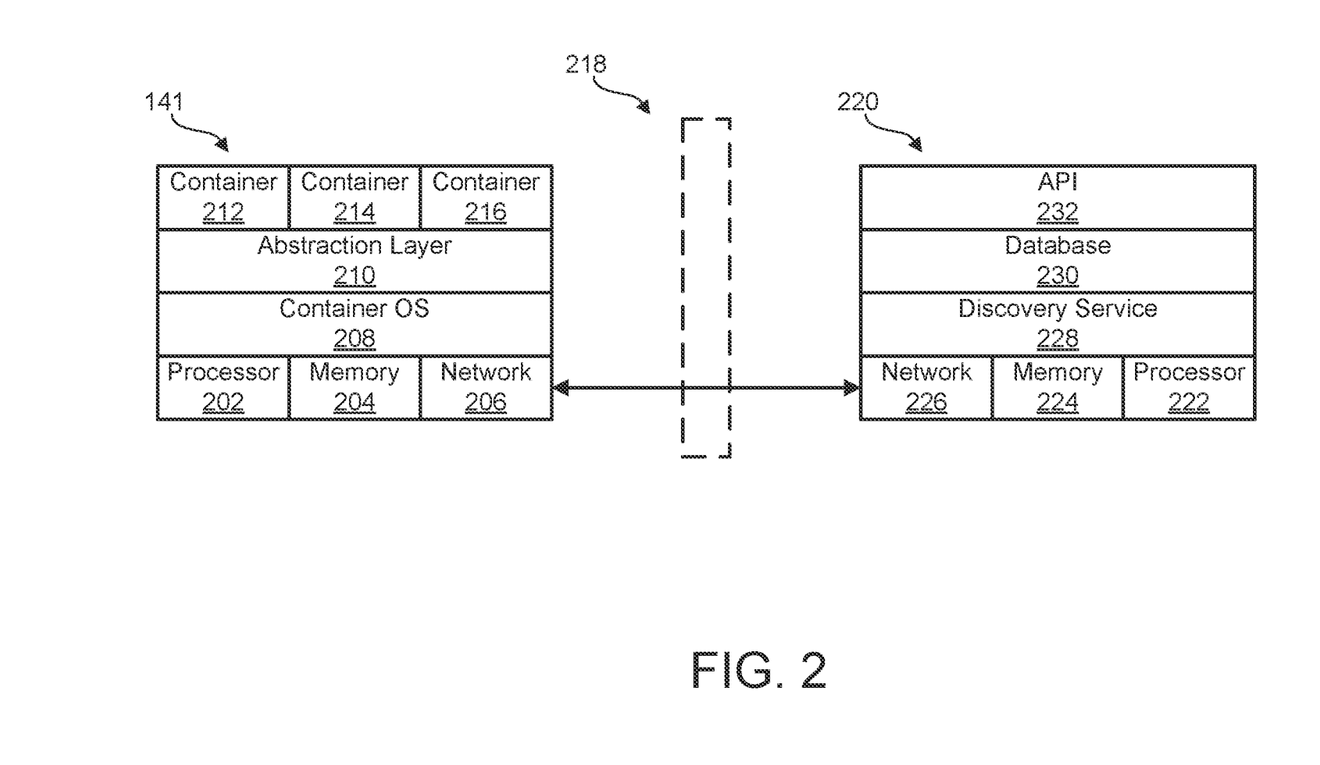
FIG. 2 illustrates a computing device running a container-based operating system in communication with a container management system of a cellular network operator, in accordance with various embodiments.

With reference to FIG. 2, UE 141 in communication with CMS 220 is shown, in accordance with various embodiments. UE 141 includes processor 202, memory 204, and network interface 206. Container OS 208 may be loaded into memory 204 and executed by processor 202 in response to UE 141 booting. The container OS includes abstraction layer 210 that runs containers 212, 214, 216. Abstraction layer 210 further includes base software libraries, dependencies, resource allocation tools, and security features accessible by or used to manage containers 212, 214, 216. A container runtime or container engine such as Containerd® may operate as an abstraction layer in certain embodiments.

The various components of CMS 220 shown in FIG. 2 can be implemented using cloud-based hardware and an appropriate operating system, although other embodiments could use other cloud platforms and/or any type of conventional physical computing hardware, as desired. Examples of suitable hardware for running CMS 220 include processor 222, memory 224, and network interface 226.

Various embodiments of container OS 208 include abstraction layer 210 with sufficient access to the network stack to communicate on network interface 206. Abstraction layer 210 grants containers walled access to the network stack to limit access to network resources. Abstraction layer 210 uses network access to request and receive updates containers 212, 214, 216. The abstraction layer runs containers 212, 214, 216 that use network tools through the abstraction layer subject to walls imposed on the containers. Containers 212, 214, 216 have limited resource access based on the access permitted by abstraction layer 210.

In various embodiments, abstraction layer 210 of container OS 208 includes container-facing services and resources that appear the same or similar to containers 212, 214, 216 regardless of which type of device is running abstraction layer 210. Abstraction layer 210 tags each container 212, 214, 216 with limitations and permissions that control access by containers 212, 214, 216 to container OS 208 and hardware resources. Abstraction layer 210 thus enables containers 212, 214, 216 to share the container OS and access hardware resources such as processor 202, memory 204, and network interface 206. Abstraction layer 210 also implements security controls that restrict or grant containers 212, 214, 216 access to or allocation of resources.

UE 141 communicates over cellular network 218 with CMS 220. Network interface 206 transmits cellular communications through a cellular communication system (e.g., system 100 of FIG. 1) to CMS 220. UE 141 regularly communicates with and through the cellular network to maintain cellular network connectivity. CMS 220 of the cellular network thus has regular contact with UE 141, in response to which CMS 220 verifies that containers 212, 214, 216 are running desired revisions.

In some embodiments, UE 141 contacts CMS 220 directly to validate containers 212, 214, 216 in response to UE 141 rebooting. UE 141 may also contact CMS 220 to validate containers 212, 214, 216 in response to UE 141 moving into another service cell, in response to launching a container 212, 214, 216, in response to a predetermined duration passing, in response to CMS 220 polling UE 141, or in response to any suitable trigger for container validation.

Embodiments of CMS 220 include discovery service 228. Discovery service 228 maintains a database 230 of information related to container deployment. Database 230 may include device identifiers associated with deployed container revisions, deployment dates, or container hash values. Database 230 may also include device configurations, container OS versions, compatibility lists, or other criteria to assess containers deployed to UE 141. Discovery service 228 may also log past installations on UE 141, API calls made by UE 141, interactions between UE 141 and cellular network 218, or other activity of interest in maintaining container-based software running on UE 141. Logs, for example, support assessment of installed or running containers as well as trouble shooting device errors. Database 230 may be a relational database, unstructured data store, flat file, structured file, data lake, or any other data storage structure or combination thereof. For example, discovery service 228 may tag container installations, UE identifiers, and resource controls in an unstructured data store to apply limitations to containers. The tags may be transmitted to container OS 208 during installation of containers 212, 214, 216 by CMS 220 to implement the limitations on running containers 212, 214, 216.

Continuing the above example, abstraction layer 210 applies labels or tags to containers to limit access by containers 212, 214, 216 to various resources of UE 141. The camera driver is excluded from an update in response to the camera being in use by a user-facing application to capture images. Container OS 208 or abstraction layer 210 may applies a wall to containers 212, 214, 216 based on tags or labels to limit access and resources available to a process (e.g., processor time, memory allocation). The wall may tend to limit negative effects of failures or errors caused by a container 212, 214, 216 by restricting access to the filesystem, network stack, computing resources, or other processes. Some embodiments may prioritize communications to certain recipients (e.g., emergency calls to 911) or functionality of certain containers based on tags applied to the containers. Resources withing the container OS may also be allocated resources based on priority as captured in tags applied to containers.

Discovery service 228 maintains data regarding container versions in association with devices and device types to enable centralized analysis of aggregated metrics. Discovery service 228 logs information from various devices and device types in response to API requests, container updates, container errors, or other triggering events of interest. The data may be aggregated to assess, for example, whether a particular container revision is throwing errors, whether a combination of user equipment and container revision appears incompatible, whether an abstraction layer running on a device or class of devices is consuming unexpected resources, or other detectable deviations from desired state. Data logged by discovery service 228 can also be used to troubleshoot UE 141 having trouble communicating on cellular network 218.

In various embodiments, discovery service 228 read records from database 230 to identify containers deployed to UE 141 with old revision numbers, security vulnerabilities, or other flaws that trigger CMS 220 to update a deployed container on UE 141. Discovery service 228 thus tends to maintain current software installations on UE 141. Discovery service 228 may also check for updates to container revisions in response to UE 141 restarting, a poll sent to UE 141, UE 141 launching a container, UE 141 making an API call, or other suitable triggers. Discovery system may use a revision number or hash value received from the UE 141 to assess the current version deployed to UE 141 and determine whether to push an update.

CMS 220 includes an application programming interface (API) to allow common access to different types of UE, in accordance with various embodiments. API calls support requests from user equipment to CMS 220 triggering checks for updates to containers; requests to download containers to run new applications; triggering updates by discovery service 228 in database 230 of added, deleted, or modified containers; or triggering storage of data from containers for future access, for example. Through API calls, various type of user equipment can interact with discovery service 228 using API 232 and cellular network 218 to manage installed software in the form of containers. API 232 is platform agnostic and results in communication and management of containers to run on an abstraction layer 210, regardless of the hardware configuration running abstraction layer 210. The same containers 212, 214, 216 may thus run on any compatible abstraction layer deployed on different types of UE.

In various embodiments, the CMS 220 maintains an orchestration registry in database 230. The orchestration registry may include a repository of container images for retrieval by UE 141 running container OS 208. The UE provider pulls images and containers for a smartphone, for example, in response to the phone launching, at predetermined times, or at regular intervals. User equipment devices may operate using container runtime systems. The containers can be compartmentalized using a container orchestration platform like Kubernetes®, which allows for instantiation by the orchestrator in the virtual plane.

Embodiments of CMS 220 of cellular network 218 serve as a platform to push or send container updates to UE 141. The CMS 220 poles UE 141 or database 230 to determine whether current container versions are running on UE 141. CMS 220 may also receive unsolicited queries or requests from user equipment that includes container data or version data for validation.

Various embodiments read network interface 206 for container OS to send downlink or uplink messages using underlying hardware of UE 141. The user equipment running a container OS may securely pass traffic to CMS 220 on startup or to check for container updates. A pipeline passes code for microservices (e.g., a camera driver, a third-party application, or an operating system service) in the form of container updates to UE 141 in some embodiments. The user equipment may use an API call that prompts users to accept/delay/reject updates to individual microservices. UE 141 requests updates to its microservices, and CMS 220 pushes updates to the micro services.

Figure 3:
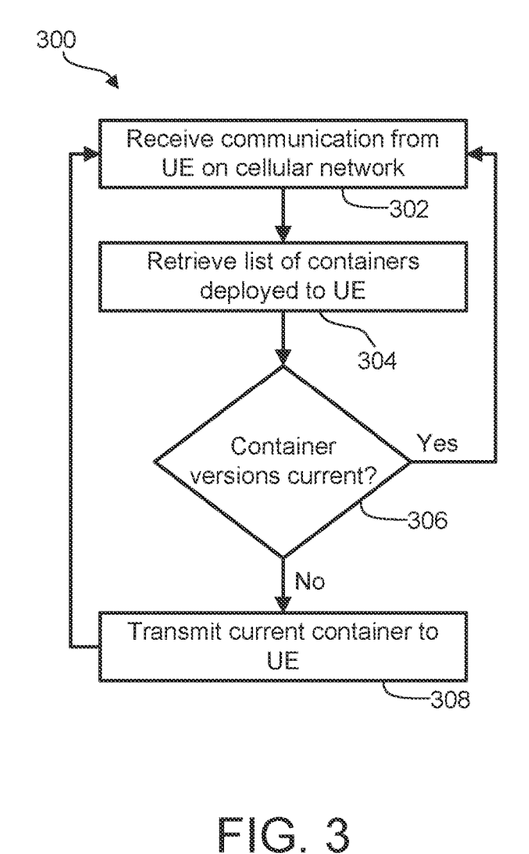
FIG. 3 illustrates an automated process for execution by a container management server of a cellular network, in accordance with various embodiments.

Referring now to FIG. 3 and with continuing reference to FIG. 2, process 300 is shown for execution by CMS 220, in accordance with various embodiments. A communication is received from UE 141 on cellular network 218 (Block 302). The communication may be a request to connect UE 141 to cellular network 218, a request to validate a container deployed on UE 141, an API request to CMS 220, a communication to other user equipment, a text message, a voice call, or any other communication using cellular network 218. In some embodiments, the communication is triggered in response to booting UE 141 or in response to UE 141 moving between cell sites in cellular network 218. The communication may also be a request for validation sent by UE 141 in response to launching container 212.

CMS 220 supporting cellular network 218 retrieves a list of containers deployed to UE 141 in response to receiving the communication (Block 304). The list may comprise current versions of all or some of the containers deployed on UE 141. The list may be the empty list in some embodiments. The list may also include containers identified in the communication from UE 141, or it may include all containers presently deployed on UE 141. CMS 220 may retrieve the list from database 230, from an argument passed in a call using API 232, or from data contained in the communication from UE 141, for example.

CMS 220 checks whether the containers on the list are the current versions (Block 306). CMS 220 may perform the check by retrieving a current version number of a container from database 230 associated with a container-based application and comparing the current version number to the version number of the container-based application that is deployed container. The check may also be performed by comparing a hash of the current container to a hash of the container deployed to UE 141. Using a newly computed hash value from the deployed container may enable CMS 220 to detect corruption in the container as well as outdated revisions. CMS 220 may also retrieve information identifying the deployed container from database 230 or from communication with UE 141. CMS 220 may perform the check for each container 212-116 on the list compiled (in block 304).

CMS 220 transmits the current container to UE 141 in response to determining the container 212 deployed or running on UE 141 is invalid (Block 308). A deployed container may be invalid in response to having an outdated revision number or an incorrect hash value. CME may take no action, or it may verify to UE 141 that no update has been triggered, in response to determining that the container 212 deployed or running on UE 141 is valid. Containers 212, 214, 216 monitored and kept updated may be drivers and firmware for UE 141 that support UE interaction with hardware and basic functions such as communications on cellular network 218, for example. CMS 220 may monitor third-party apps or other software deployed to UE 141 in some embodiments.

Figure 4:
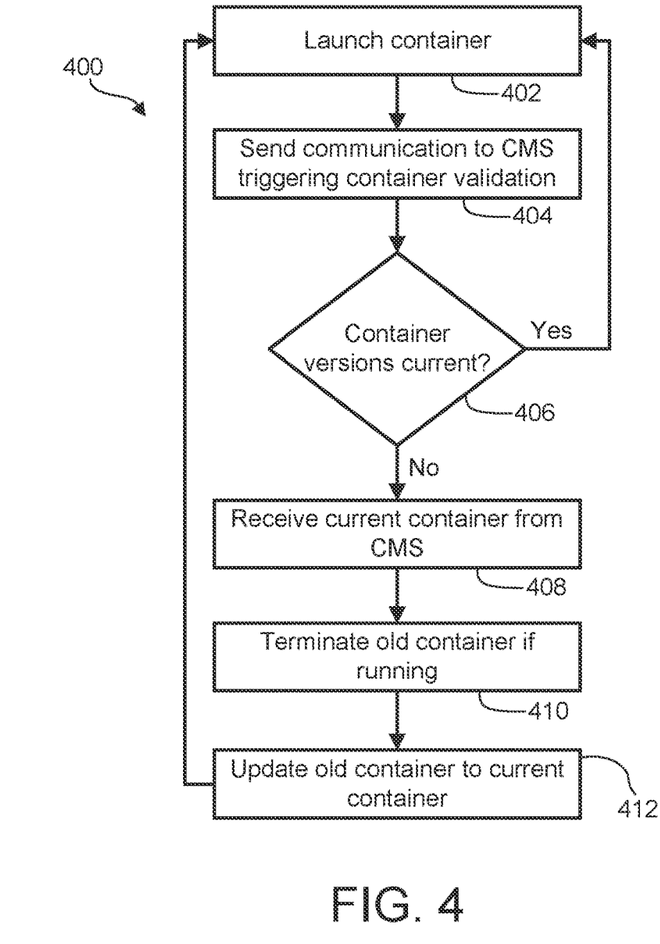
FIG. 4 illustrates an automated process for execution by user equipment communicating with a cellular network, in accordance with various embodiments.

With reference to FIG. 4 and continuing reference to FIG. 2, process 400 is shown for execution by UE 141 running container OS 208, in accordance with various embodiments. UE 141 launches container 212 (Block 402). Container 212 may be firmware launched in response to booting UE 141. For example, container 212 may be a driver for a cellular communication circuit used to communicate on network 218.

UE 141 sends a communication to CMS 220 triggering validation of container 212 (Block 404). The communication may be sent directly or indirectly to CMS 220. Examples of direct communications include transmissions identifying an IP address of CMS 220 or a call using API 232 of CMS 220. Examples of indirect communication may include authenticating with cellular network 218, communications establishing connection with a cell site, receiving or sending data on cellular network 218, or other communications that a host or guest operator (e.g., host 101 and guest 102 of FIG. 1) can use to trigger container validation by CMS 220 (e.g., host CMS 106 or guest CMS 107).

UE 141 receives communication from CMS 220 indicating whether the container version is current (Block 406). UE 141 may continue operating until another container is launched in response to the container version being current. If the container version is outdated, UE 141 receives the current revision of container 212 from CMS 220 (Block 408). The current revision of container 212 may be a newer version or may be a rollback to an older version. In some embodiments, the current revision is a complete replacement of the dated container with a new container.

Embodiments of UE 141 may install the received container by terminating the dated container if running (Block 410). A running container 212, 214, 216 may be terminated without terminating or restarting UE 141, abstraction layer 210, or container OS 208. Some embodiments tend to avoid replacing executing code. The container OS may lock updates from a particular container in response to the container being in use. New code for container updates may be stored in a database, memory, or cache and executed once the lock for updates expires in response to a microservice ceasing operation. User equipment may run a check before running updated code to determine whether the old code is in use. If old code is not in use, then the container OS may switch to running new code. The container OS may also kill the old process if the process was still running, for example if the process was idling.

Termination may result in temporary suspension of services supported by the terminated container 212. Suspended services are reattempted on launch of a replacement container or after a delay. For example, a text message sent by UE 141 may be interrupted by a container termination. UE 141 may reattempt to send the message in response to the container launching or after a delay having a predetermined duration.

UE 141 updates the container to the current version (Block 412). The old container may be overwritten on permanent storage while the old container is still running in some embodiments. The current version of the container is launched in response to installing the current version or in response to terminating the old container. Tags relating to the old container are overwritten or replaced with tags relating to the current version. An updated container may thus be subject to different access limits to resources than the dated version of the container previously installed.

Some embodiments may be demanding on computing resources (e.g., processor and memory resources) in response to running multiple instances of containers on a piece of equipment. Embodiments of a container OS may allow sequential upgrades that complete slower and are less demanding of hardware resources. IOT devices, for example, may have limited processing power and may thus use a serial update technique to conserve processing power. A serial update may update a single container or a predetermined number of containers at a time. Some embodiments may implement parallel updates that complete more quickly and are more demanding on computing hardware than serial updates. A smartphone or connected automobile may have sufficiently powerful computing hardware to support parallel updates, for example. CMS 220 may rollout updates serially or in parallel depending on device type.

Embodiments of the container OS described herein tend to enhance security by labeling and walling off containers. Each container is assigned its own access controls that limit modifications and resources the container may access while running. Containers may be monitored individually for resource usage and access. Containers operating different than expected may be terminated, updated, or restarted. For example, a camera service running as a container may be using more memory than expected, and the user equipment or discovery service may terminate the camera service, update the container as necessary, and relaunch the camera service without rebooting the user equipment. Users may thus maintain access to their devices and data during firmware updates.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

What is claimed is:

1. A method of updating a smartphone using a container management server (CMS) of a cellular network, the method comprising:
   receiving a communication from the smartphone running a container-based operating system (container OS) over the cellular network;
   retrieving, by the CMS managing the container OS on the smartphone, a list of containers deployed on the smartphone;
   comparing, by the CMS managing the container OS on the smartphone, a deployed container from the list to an updated container to identify the deployed container as invalid, wherein the deployed container comprises a grouping of an application with dependencies and libraries, wherein the deployed container is configured to run on a plurality of different cellular devices in communication with the CMS over the cellular network; and
   pushing, by the CMS managing the container OS on the smartphone, the updated container to the smartphone in response to identifying the deployed container as invalid, wherein the updated container comprises an updated grouping configured to run on the plurality of different cellular devices in communication with the CMS over the cellular network.

2. The method of claim 1, wherein the smartphone terminates the deployed container running on the smartphone in response to the deployed container being identified as invalid.

3. The method of claim 2, wherein the smartphone replaces the deployed container with the updated container in response to terminating the deployed container.

4. The method of claim 3, wherein the smartphone launches the updated container in response to replacing the deployed container with the updated container.

5. The method of claim 1, further comprising logging, by the CMS, health data related to the deployed container running on the smartphone.

6. The method of claim 1, wherein the communication from the smartphone comprises an API call directed to the CMS.

7. The method of claim 1, wherein the communication from the smartphone is directed to a network host to establish a connection on the cellular network.

8. The method of claim 1, wherein the communication from the smartphone is in response to booting the smartphone.

9. The method of claim 1, wherein the updated container is configured to run on an abstraction layer of the container OS on the smartphone.

10. The method of claim 1, wherein the deployed container comprises a previous version of firmware supporting transmission on the cellular network, wherein the updated container comprises a current version of the firmware supporting the transmission on the cellular network.

11. A container management server (CMS) comprising a processor in communication with a non-transitory computer readable medium configured to store instructions thereon that, when executed by the processor, cause the CMS to perform operations, the operations comprising:
   receiving a communication from a smartphone running a container-based operating system (container OS) over a cellular network;
   retrieving, by the CMS managing the container OS on the smartphone, a list of containers deployed on the smartphone;
   comparing, by the CMS managing the container OS on the smartphone, a deployed container from the list to an updated container to identify the deployed container as invalid, wherein the deployed container comprises a grouping of an application with dependencies and libraries, wherein the deployed container is configured to run on a plurality of different cellular devices in communication with the CMS over the cellular network; and pushing, by the CMS managing the container OS on the smartphone, the updated container to the smartphone in response to identifying the deployed container as invalid, wherein the updated container comprises an updated grouping configured to run on the plurality of different cellular devices in communication with the CMS over the cellular network.

12. The CMS of claim 11, wherein the smartphone terminates the deployed container running on the smartphone in response to the deployed container being identified as invalid.

13. The CMS of claim 12, wherein the smartphone replaces the deployed container with the updated container in response to terminating the deployed container.

14. The CMS of claim 11, further comprising logging, by the CMS, health data related to the deployed container running on the smartphone.

15. The CMS of claim 11, wherein the communication from the smartphone comprises an API call directed to the CMS.

16. The CMS of claim 11, wherein the updated container is configured to run on an abstraction layer of the container OS on the smartphone.

17. The CMS of claim 11, wherein the deployed container comprises a previous version of firmware supporting transmission on the cellular network, wherein the updated container comprises a current version of the firmware supporting the transmission on the cellular network.

18. A non-transitory computer readable medium storing instructions thereon that, when executed by a processor, cause a container management server (CMS) to perform operations, the operations comprising:

receiving a communication from a smartphone running a container-based operating system (container OS) over a cellular network;

retrieving, by the CMS managing the container OS on the smartphone, a list of containers deployed on the smartphone;

comparing, by the CMS managing the container OS on the smartphone, a deployed container from the list to an updated container to identify the deployed container as invalid, wherein the deployed container comprises a grouping of an application with dependencies and libraries, wherein the deployed container is configured to run on a plurality of different cellular devices in communication with the CMS over the cellular network; and pushing, by the CMS managing the container OS on the smartphone, the updated container to the smartphone in response to identifying the deployed container as invalid, wherein the updated container comprises an updated grouping configured to run on the plurality of different cellular devices in communication with the CMS over the cellular network.

19. The non-transitory computer readable medium of claim 18, further comprising logging, by the CMS, health data related to the deployed container running on the smartphone.

20. The non-transitory computer readable medium of claim 18, wherein the updated container is configured to run on an abstraction layer of the container OS on the smartphone.

* * * * *